United States Patent
Suryanarayana et al.

(10) Patent No.: US 7,343,174 B2
(45) Date of Patent: Mar. 11, 2008

(54) WIRELESS ELECTRONIC DRIVE-THRU SYSTEM AND METHOD

(75) Inventors: Lalitha Suryanarayana, Austin, TX (US); Michael F. Grannan, Austin, TX (US); David Patron, Cedar Park, TX (US)

(73) Assignee: AT&T Knowledge Ventures, L.P., Reno, NV (US)

( * ) Notice: Subject to any disclaimer, the term of this patent is extended or adjusted under 35 U.S.C. 154(b) by 659 days.

(21) Appl. No.: 10/421,366

(22) Filed: Apr. 23, 2003

(65) Prior Publication Data
US 2004/0214597 A1 Oct. 28, 2004

(51) Int. Cl.
*H04M 1/00* (2006.01)

(52) U.S. Cl. .................. 455/553.1; 455/41.2; 455/406; 455/414.1; 455/414.2; 455/3.06; 455/552.1; 455/418; 455/569.2; 705/15; 705/16; 705/17; 705/26; 709/203

(58) Field of Classification Search ............... 455/41.2, 455/406, 414.1, 414.2, 3.06, 553.1, 418, 455/569.2; 705/15–17, 26; 709/203
See application file for complete search history.

(56) References Cited

U.S. PATENT DOCUMENTS

| | | | |
|---|---|---|---|
| 5,845,263 A * | 12/1998 | Camaisa et al. | 705/27 |
| 5,850,214 A * | 12/1998 | McNally et al. | 345/173 |
| 6,026,375 A | 2/2000 | Hall et al. | |
| 6,157,908 A * | 12/2000 | O'Gwynn | 704/226 |
| 6,253,956 B1 | 7/2001 | Khan et al. | |
| 6,263,316 B1 | 7/2001 | Khan et al. | |
| 6,384,850 B1 | 5/2002 | McNally et al. | |
| 6,417,781 B1 | 7/2002 | Matsumoto | |
| 6,493,562 B2 | 12/2002 | Yoshida et al. | |
| 6,813,609 B2 * | 11/2004 | Wilson | 705/14 |
| 2001/0034760 A1 * | 10/2001 | Paton | 709/203 |
| 2002/0013730 A1 * | 1/2002 | Bigus | 705/15 |
| 2002/0091577 A1 * | 7/2002 | Parry et al. | 705/26 |
| 2002/0138350 A1 * | 9/2002 | Cogen | 705/15 |
| 2002/0143638 A1 * | 10/2002 | August et al. | 705/26 |
| 2002/0156682 A1 * | 10/2002 | DiPietro | 705/16 |
| 2002/0197955 A1 * | 12/2002 | Witkowski et al. | 455/41 |

FOREIGN PATENT DOCUMENTS

WO WO-0175735 * 10/2001

* cited by examiner

*Primary Examiner*—Steve M. D'Agosta
(74) *Attorney, Agent, or Firm*—Toler Law Group

(57) ABSTRACT

In a particular embodiment, the disclosure is directed to a system including a customer authentication and payment server, a merchant data server, a merchant network, and a merchant station. The merchant data server is coupled to a public data network and the public data network is coupled to the customer authentication and payment server. The merchant network is coupled to the merchant data server and the merchant station. The merchant station includes a communication interface to provide for wireless communication with customers located within a wireless coverage area using an ad hoc connection.

53 Claims, 3 Drawing Sheets

WIRELESS ELECTRONIC DRIVE-THRU SYSTEM AND METHOD

FIELD OF THE INVENTION

The present disclosure relates to a wireless drive-thru system and a method for facilitating an order.

BACKGROUND

Drive-thru services represent a large portion of convenience shopping. The multi-billion fast food industry sells as much as 50 percent of its meals through drive-up or drive-thru services. Various industries including food service, banking, pharmacy service, and laundry services enhance customer service through drive-thru options.

However, drive-up and drive-thru services can be inefficient and employee intensive. Some fast food chains use as many as four people to provide drive-thru service during peak hours. One person takes the orders, another person exchanges money, a third person prepares drink orders and hands completed orders to the customer, and a fourth person prepares the food portion of the order. The employee intensive nature of the drive-thru service represents a significant cost to convenience service industries. On the other hand, longer average service times reduces the number of customers served in any given time period and result in lost revenue.

In addition to the employee intensive nature of fast drive-thru service, typical systems suffer from miscommunication and order confusion caused by poor speakers and microphones. Voice communication over poor quality speakers and microphones compete with noise from idling engines, car audio systems, and other ambient noise. On many occasions, customers lean out of their vehicle despite many occasions, customers lean out of their vehicle despite inclement weather conditions to shout orders. The subsequent response through the poor quality speakers often leaves the customer uncertain as to whether the order is correct or how much is owed.

As such many typical drive-thru systems suffer from employee-intensive service and poor communication with customers. Accordingly, an improved drive-thru service system is needed.

SUMMARY

In one particular embodiment, the disclosure is directed to a system including a customer authentication and payment server, a merchant data server, a merchant network, and a merchant station. The merchant data server is coupled to a public data network and the public data network is coupled to the customer authentication and payment server. The merchant network is coupled to the merchant data server and the merchant station. The merchant station includes a communication interface to provide wireless communication with customers located within a wireless coverage area using an ad hoc connection.

In another embodiment, the disclosure is directed to a method of processing wireless electronic drive-thru orders. The method comprises receiving notification at a merchant data server that a telematics control unit is detected within a wireless coverage area; communicating an order selection menu from the merchant data server to the telematics control unit over a wireless channel; receiving an order selection from the telematics control unit; authenticating the use of the telematics control unit at a networked authentication server remote from the merchant service terminal; and fulfilling the order selection received from the telematics control unit. The order selection may be communicated via data over the wireless channel.

In a further embodiment, the disclosure is directed to a method of placing a wireless electronic drive-thru order. The method includes receiving a service notification at a telematics control unit located within a wireless coverage area supported by a merchant electronic drive-thru service; receiving and displaying an order selection menu communicated by the merchant electronic drive-thru service over a wireless channel; sending an order selection from the telematics control unit to the merchant electronic drive-thru service over the wireless channel using a secured connection; receiving electronic confirmation at the telematics control unit; and making a payment for the order. The electronic confirmation may be associated with acceptance of the order selection.

BRIEF DESCRIPTION OF THE DRAWINGS

The use of the same reference symbols in different drawings indicates similar or identical items.

DETAILED DESCRIPTION OF THE DRAWINGS

Automation of the ordering process in a drive-thru service may enhance customer experience, reduce costs associated with employee intensive service, and accelerate service timing. Improved interaction with customers and enhanced payment options can also lead to a lower cost, more efficient service.

Figure 1:
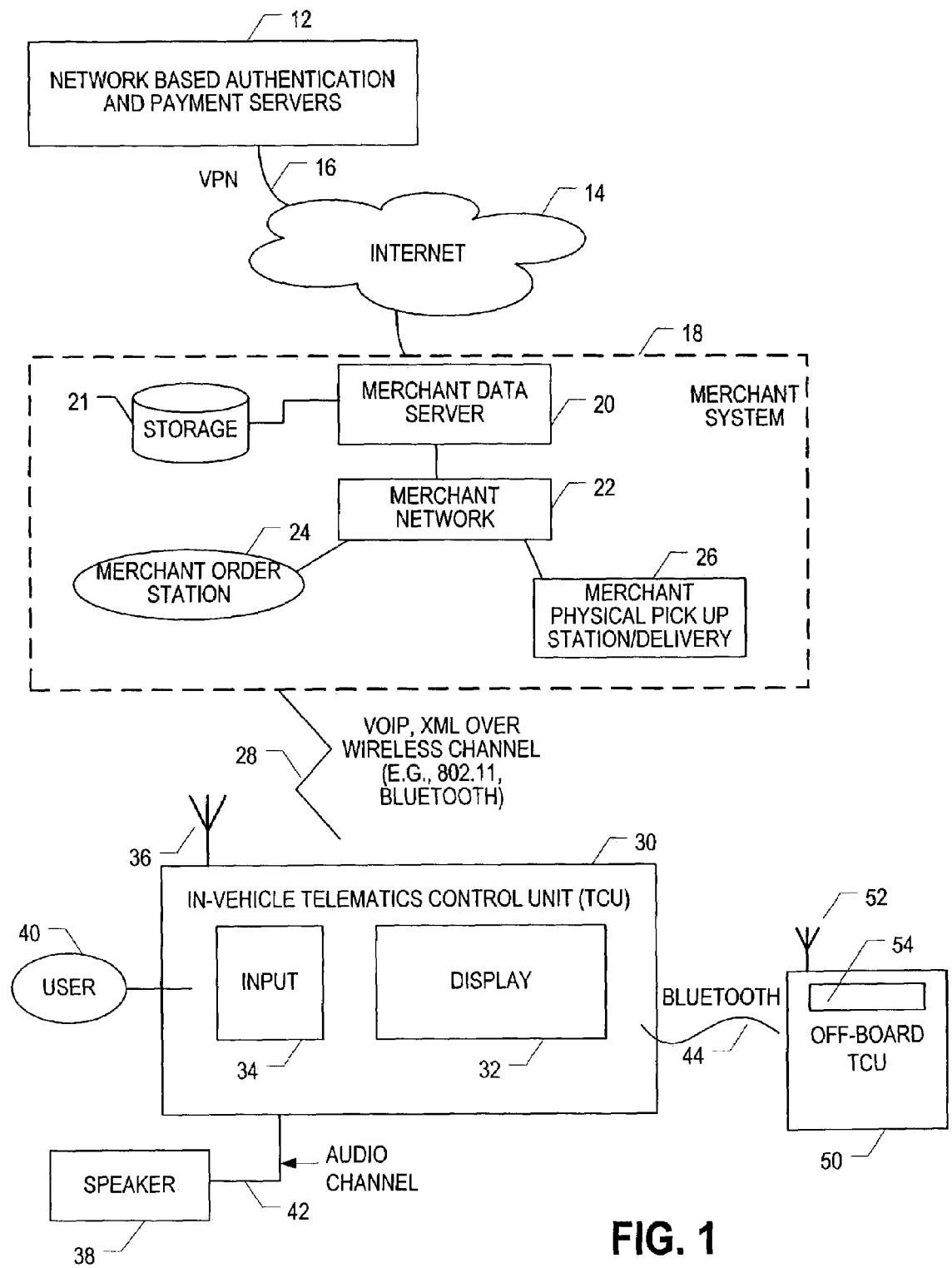
FIG. 1 is an exemplary drive-thru order system.

FIG. 1 depicts an exemplary embodiment of a drive-thru support system. The system includes a merchant system 18 in communication with a telematics control unit (TCU) 30. The merchant system 18 includes a merchant data server 20, a merchant network 22, and a merchant order station 24. The merchant data server 20 is coupled to the merchant network 22 and to a public network 14, such as the Internet. The merchant data server 20 may also be connected to data storage 21. The data storage 21 is used to store user preferences (e.g.; "the usual") which will allow for a customized order menu presented to the user when he/she pulls into range of the adhoc network area. The merchant network 22 is coupled to a merchant order station 24 and may be coupled to a merchant physical pick up station 26. The merchant order station 24 may include a cordless headset for use by an employee or merchant representative. The merchant physical pick-up station 26 may include displays for showing validated orders and a device for accepting payment such as a register and/or card reader.

The merchant system 18 wirelessly communicates with at least one telematics control unit such as the illustrated in-vehicle telematics control unit 30 or an off-board portable telematics control unit 50. The wireless communication may utilize various protocols such as 802.11 and Bluetooth®. An in-vehicle telematics control unit 30 may include one or more input devices 34, displays 32, and an antenna 36 and may be embedded within the dashboard of a vehicle. A speaker 38 may also be coupled to the in-vehicle telematics control unit 30 via an audio channel 42. The input devices 34 may include input options such as touch screens, keyboards, natural language inputs such as speech, pen inputs, and gesture interfaces. The display 32 and the input devices 34 may, separately or in combination, provide a multi-modal customer interface. Through the in-vehicle telematics control unit 30, the user 40 may interact with the merchant system 18 to place an order and make payment.

The off-board telematics control unit 50 may include a display 54 and an antenna 52. The off-board telematics control unit 50 may also include various input devices. The off-board telematics control unit 50 may communicate with the merchant system 18 using some of the vehicle capabilities via a wireless protocol 44 using standards such as Bluetooth®, 802.11, or Ultra Wideband. Separately or in combination, the in-vehicle telematics control unit 30 and the off-board telematics control unit 50 may communicate with the merchant system 18 to facilitate ordering and payment. An example of an off board TCU is a mobile device (e.g., GSM/GPRS or CDMA enabled device) or a wireless personal digital assistant (PDA).

In a particular example, a user 40 may drive into a wireless network active coverage region of the merchant system 18, such as a drive-thru or drive-up service area. The merchant order station 24 may interact wirelessly with the in-vehicle telematics control unit 30. This interaction may include transmission of identifiers, menus, orders, voice communications, advertisements, and payment data, among others. The interaction may utilize various standards and protocols such as 802.11, Ultra Wideband, and Bluetooth® and may take various forms such as XML data, voice over IP (VOIP), HTML, image files, and video and audio format files. Menus may be shown on the display 32. For example, XML data may be enhanced to customize the menu shown on the display 32. Audio signals may be transmitted through the audio channel 42 to the speaker 38. The user 40 may respond through various input devices 34 and place an order. In one example, the user 40 may interact with a touch screen display to select items. In another example, the user 40 may use a microphone and interact with an employee of the merchant through a VOIP transmission. In a further example, the user 40 may interact with an off-board telematics control unit 50, entering order or payment information that is transmitted to the merchant system 18 leveraging vehicle capabilities.

The order and payment data are transmitted through the wireless channel 28 to the merchant system 18. The merchant system 18 interacts with one or more network-based authentication and payment servers 12 to authenticate the telematics control unit and/or facilitate payment. For example, the user may have a stored profile on the authentication server that includes an account. The account may be a line of credit, a link to a payment account, or a prepaid account. Alternately, the user may use cash, electronic payment, debit card, credit card, points, or coupons, among other methods of payment. The stored profile may also include preferences about purchases, menu selections, etc. The merchant system 18 may interact with the one or more network-based authentication and payment servers 12 through a virtual private network connection 16 and a public network 14.

In one exemplary embodiment, the user 40 drives into a region covered by a wireless local area network or a wireless personal area network. The merchant system 18 establishes adhoc communication with the in-vehicle telematics control unit 30 through a wireless channel. The in-vehicle telematics control unit 30 may transmit authentication data that may be authenticated through the network-based authentication and payment server 12. The merchant order station 24 interacts with the in-vehicle telematics control unit 30 through a wireless channel 28, delivering a menu. Such a menu may be customized based on user preferences or historical data about previous transactions stored in the merchant storage or remotely along with the user profile and authentication data. The user interacts with the menu and merchant order station 24 using the in-vehicle telematics control unit 30 to place an order and to pay. This interaction may provide the option to select a preferred language. The merchant system 18 may store information such as preferences and favorite orders in storage 21 or at a network-based authentication and payment server 12. In one example, the user 40 may interact with a merchant representative through a speaker 38 and microphone associated with in-vehicle telematics control unit 30. The merchant representative may have a cordless headset associated with the merchant system 18. Payment for the order may be made automatically through saved profiles and payment information on the network-based authentication and payment server 12 or through electronic payment methods, such as electronic wallet. Alternately, the user may transmit credit card or debit card information. Further, the user may pay using cash or other physical means when approaching a fulfillment station such as a payment station or physical pick-up station 26.

Once the order is received, the merchant data server 20 interacts with the merchant order station 24 through the merchant network 22. The merchant data server 20 may authenticate the telematics control units 30 or 50 or the user 40 to validate the order. An order confirmation or unique order identifier may be transmitted to the telematics control unit 30 or 50. The order is then transferred to the physical pick-up station 26 for preparation and delivery. The telematics control units 30 or 50 may again interact with the merchant system 18 or the physical pick-up station 26 to identify the order and associate the correct order with the correct user.

In another exemplary embodiment, more than one vehicle, each having a telematics control unit may enter the active region or area of the wireless local area network. The merchant system 18 may interact with each of the telematics control units to establish communications channels, facilitate orders, collect payment, and transfer data. Each of the telematics control units may place separate orders and each of the telematics control units may make electronic payments and be separately authenticated. For example, a first vehicle with a first telematics control unit may place a first order and a second vehicle with a second telematics control unit may place a second order. Both telematics control units may pay separately and be separately authenticated. Furthermore, data transferred from each of the telematics control units may be stored at the merchant data server 20.

Figure 2:
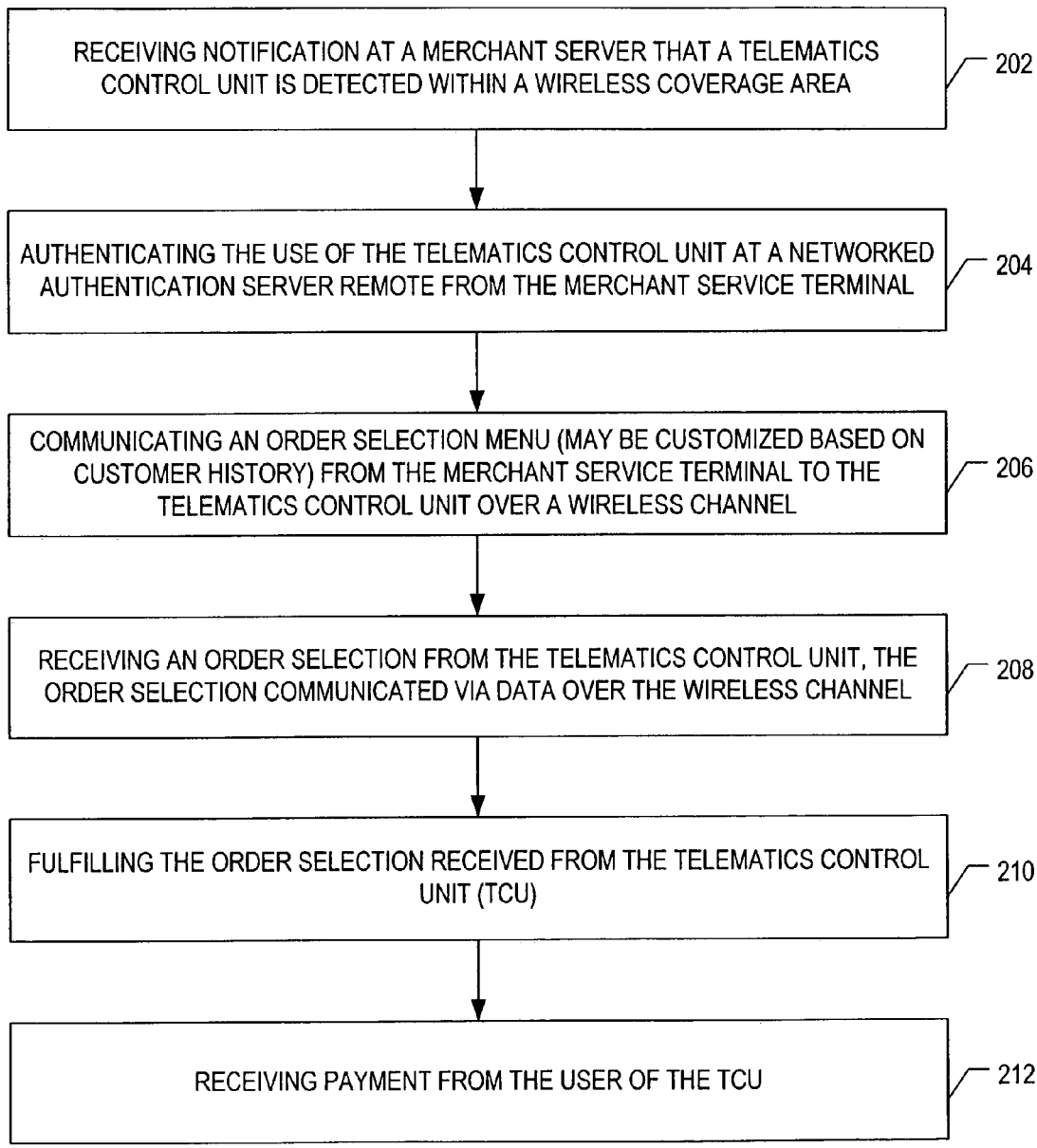
FIG. 2 is an exemplary method of processing wireless electronic drive-thru orders.

FIG. 2 depicts an exemplary method of processing a wireless electronic drive-thru order. The merchant server receives notification that a telematics control unit has been detected within the wireless coverage area, at step 202. The wireless coverage may be provided through an ad hoc network, such as an 802.11 network or a Bluetooth® network, among others. The network may utilize various protocols permitting ad hoc access. The telematics control unit is authenticated using a networked authentication server located remotely from the merchant service terminal, at step 204.

At step 206, a merchant services terminal communicates a customized order selection menu to the telematics control unit over a wireless data channel. The telematics control unit may include a multi-modal user interface and the order selection menu may include video, images, text descriptions, and audio announcements associated with the available items. The telematics control unit may also include a touch screen, keyboard, or spoken command interface. The order selection menu may be customized based on user history. For example, a single touch link to a favorite order may be displayed. In another example, the language of the order selection menu may be preferentially pre-selected based on past interactions. The user may also initiate an interaction with a merchant representative. This interaction may be a voice chat session or a text message chat.

The merchant system receives an order selection from the telematics control unit over the wireless channel, at step 208. The telematics control unit may transmit the order selection. Alternately, an interactive voice and/or text chat session may be established.

At step 210, the system then facilitates the fulfillment of the order selection received from the telematics control unit. Order fulfillment may include interaction with display systems on preparation lines or interaction with a fulfillment display at a pick-up window. At step 212, payment is received from the user. The user may provide payment approval to the merchant system through the telematics control unit. This payment may include receiving an electronic payment from the telematics control unit using a secured communications channel. Alternately, payment may be made physically using cash, a smart card, a traditional credit card, a debit card, a check, or payment options selectively accepted by the merchant. Various other payment methods may also be used such as points and coupons. The system may also confirm the placement of the order selection electronically and/or send a unique order identifier associated with the order selection. The unique order identifier may be used to associate an order with a vehicle (such as via Vehicle Identification Number or License number) or user at the pick-up location.

Figure 3:
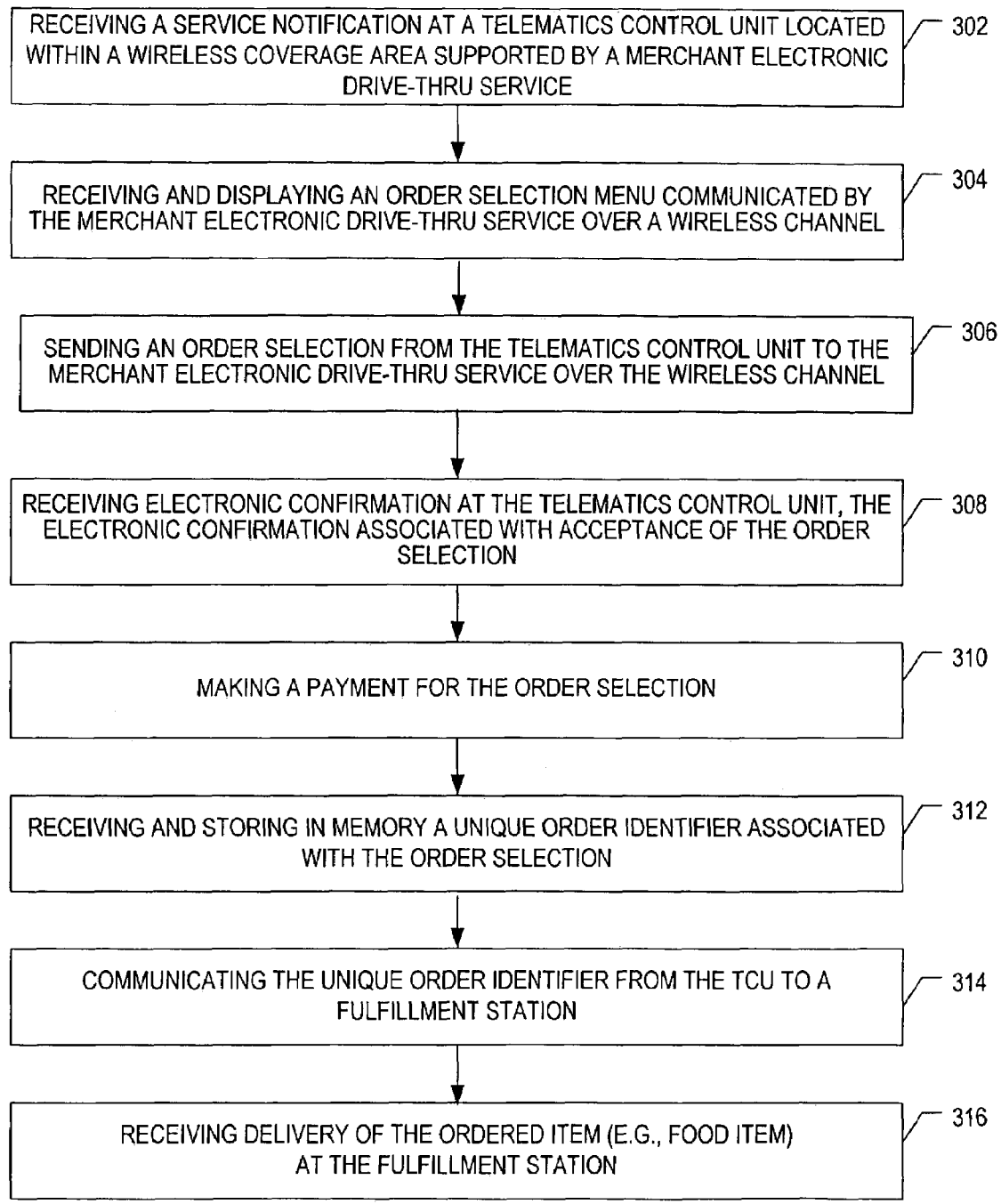
FIG. 3 is an exemplary method of placing a wireless electronic drive-thru order.

FIG. 3 depicts an exemplary method of placing a wireless electronic drive-thru order. At step 302, a telematics control unit located within a wireless coverage area receives a service notification from a merchant electronic drive-thru service. The wireless coverage may be facilitated through an ad hoc wireless network. The telematics control unit may initiate an interaction with the merchant electronic drive-thru service. The telematics control unit receives and displays order selection menus communicated by the merchant electronic drive-thru service over the wireless data channel, at step 304. The telematics control unit may include a multi-modal user interface and input devices such as a touch screen, keyboard, and spoken entry interface. The order selection menu may include video, images, text descriptions, and audio announcements associated with items available in the order selection menu. This order selection menu may be customized based on customer order history, availability, or customer language preference. For example, a user may be presented with a default order based on past order behavior or a pre-order.

The user may also initiate an interaction with a merchant representative. This interaction may be a voice chat session or a text message chat.

The telematics control unit sends an order selection to the merchant electronic drive-thru service over the wireless data channel, at step 306. The telematics control unit may then receive an electronic confirmation associated with the accepted order, at step 308. The user may then make payment for the order selection. For example, the telematics control unit may transfer payment information electronically, at step 310. Alternately, the user may pay using other methods at various steps along the process. For example, the user may pay at a fulfillment station such as a pick-up window, drive-in space, drive-thru lane, counter, or terminal.

The telematics control unit may receive and store a unique order identifier associated with the order selection, at step 312. This unique order identifier may be communicated to a fulfillment station terminal by the telematics control unit, at step 314. In this manner, an order may be associated with a vehicle or customer at the fulfillment station. The user then receives delivery of the ordered item at the fulfillment station, as shown at step 316.

In one embodiment, a user initially parks the vehicle near the merchant location but does not join a fulfillment line. The user joins the fulfillment line/pickup lane only after receiving a notification indicating that the order is ready or soon to be ready (in other words the system can inform the user when to join the lane or which lane to join)

In this manner, delivery of any items ordered, such as food items, dry-cleaning, and pharmacy items, may be facilitated. Alternately, a reservation at a crowded restaurant can be made in which case the user may drive away and be notified of the availability of seating in the restaurant (where there is a wait time). Automated order selection and payment may accelerate service and decrease employee requirements. Through such a system, customers may receive more efficient, cost effective service.

The above-disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system comprising:
 a customer authentication and payment server;
 a merchant data server, the merchant data server coupled to a public data network, the public data network coupled to the customer authentication and payment server;
 a merchant network coupled to the merchant data server; and
 a merchant station coupled to the merchant network, the merchant station including a communication interface to provide for adhoc wireless communication between the merchant data server and wireless communication devices of customers located within a wireless coverage area, the merchant station adapted to provide an order selection menu to the wireless communication devices to facilitate a transaction, the order selection menu comprising a text description and an image associated with at least one item on the order selection menu;
 wherein at least one of the customers is located within a vehicle having a telematics control unit;
 wherein a merchant representative, via the merchant station and the wireless communication interface, may communicate with the customer via the telematics control unit; and
 wherein data communicated between the telematics control unit and the merchant server has an XML type data format.

2. The system of claim 1 wherein the merchant data server stores data about user preferences and previous history of transactions to provide a customized experience for the customer.

3. The system of claim 1 wherein user preferences and history data of transactions are stored remotely from the merchant data server.

4. The system of claim 1, wherein the adhoc wireless communication interface is one of a wireless local area network and a wireless personal area network.

5. The system of claim 1, wherein the merchant station includes a cordless headset for use by the merchant representative.

6. The system of claim 1, wherein the telematics control unit includes a multi-modal customer interface, the multi-modal customer interface involving interactive menu selection via a selection input selected from at least one of a touch screen, a keyboard, natural language, pen input, and user movement.

7. The system of claim 6, wherein the adhoc wireless communication interface carries voice data over a voice over internet protocol channel.

8. The system of claim 1, wherein the XML type data is enhanced to provide further customization for display at a user interface of the telematics control unit.

9. The system of claim 1, wherein the telematics control unit is an on-board unit embedded within a dashboard area of the vehicle.

10. The system of claim 1 wherein the telematics control unit is an offboard telematics control unit comprising a wireless device.

11. The system of claim 10 wherein the wireless device is one of a mobile phone, wireless personal digital assistant, and a laptop computer.

12. The system of claim 1, wherein a first customer is located within a first vehicle having a first telematics control unit, a second customer is located within a second vehicle having a second telematics control unit, the first and second vehicles located within the wireless coverage area, and wherein a merchant representative, via the merchant station and the wireless communication interface, may communicate with the first customer via the first telematics control unit and may communicate with the second customer via the second telematics control unit and wherein the merchant station is coupled to the merchant data server.

13. The system of claim 12, wherein the first customer requests and receives order options and places a first order via the first telematics unit and the second customer requests and receives the order options and places a second order via the second telematics unit.

14. The system of claim 13, wherein the merchant fulfills the first order and the second order and wherein the first customer makes a first electronic payment and picks up the first order and the second customer makes a second electronic payment and picks up the second order.

15. The system of claim 14, wherein the first electronic payment and the second electronic payment are each separately authenticated and processed by the remote customer authentication and payment server.

16. The system of claim 14, wherein data associated with the first order and data associated with the second order is communicated over the merchant network and stored at the merchant data server.

17. The system of claim 14 wherein the merchant notifies at least one of the customers of the status of the order and procurement instructions.

18. A method of processing wireless electronic drive-thru orders comprising:
receiving notification at a merchant data server that a telematics control unit is detected within a wireless coverage area;
communicating an order selection menu from a merchant service terminal to the telematics control unit over a wireless channel, the order selection menu comprising a text description and an image associated with at least one item on the order selection menu and video and audio announcements associated with each available item of the order selection menu;
receiving an order selection from the telematics control unit, the order selection communicated via data over the wireless channel; authenticating the use of the telematics control unit at a networked authentication server remote from the merchant service terminal; and fulfilling the order selection received from the telematics control unit.

19. The method of claim 18, wherein the telematics control unit provides a multi-modal user interface to a user.

20. The method of claim 18, wherein the networked authentication server returns identifying information associated with vehicles owned by a user to facilitate matching the vehicle with the drive-thru order at pickup or for providing a customized order menu.

21. The method of claim 18, wherein the wireless coverage area is a wide area cellular or wireless data network.

22. The method of claim 18, wherein the wireless coverage area is provided using Ultra Wideband technology.

23. The method of claim 18, further comprising receiving payment approval from a user of the telematics control unit, and wherein communication between the telematics control unit and a merchant server coupled to the merchant service terminal is secured.

24. The method of claim 23, wherein the payment is at least one of cash, smart card, electronic payment, debit card, credit card, points, coupons, and a stored profile in an authentication server.

25. The method of claim 18, further comprising an option to select a desired language option for the order selection menu.

26. The method of claim 18 wherein the order section menu is customized based on at least one of user preferences and history information derived from previous transactions.

27. The method of claim 18, wherein the order selection is made at the telematics control unit by at least one of a touch screen entry, a keyboard entry, and a spoken command.

28. The method of claim 18, further comprising initiating an interactive session between a user of the telematics control unit and a merchant representative operating the merchant service terminal.

29. The method of claim 28, wherein the interactive session is one of a voice chat session and a text message chat session.

30. The method of claim 18, further comprising electronically confirming placement of the order selection.

31. The method of claim 30, further comprising offering a plurality of different payment options for the order selection.

32. The method of claim 31, further comprising communicating a unique order identifier associated with the order selection to the telematics control unit.

33. The method of claim 18, further comprising providing a subsequent notification of status of order and directions on pickup or delivery.

34. A method of placing a wireless electronic drive-thru order comprising:
receiving a service notification at a telematics control unit located within a wireless coverage area supported by a merchant electronic drive-thru service, the telematics control unit being mobile relative to the merchant electronic drive-thru service;

initiating an interactive session between the telematics control unit and a representative of the merchant electronic drive-thru service;

receiving and displaying on the telematics control unit an order selection menu communicated by the merchant electronic drive-thru service over an adhoc wireless channel, the order selection menu comprising an image and a text description related to at least one item on the order selection menu;

sending an order selection from the telematics control unit to the merchant electronic drive-thru service over the wireless channel using a secured connection; receiving electronic confirmation at the telematics control unit, the electronic confirmation associated with acceptance of the order selection; and making a payment for the order selection.

35. The method of claim 34, wherein the telematics control unit provides a multi-modal user interface to the user.

36. The method of claim 34, wherein the order selection menu is customized based on user preferences and historical information.

37. The method of claim 34, wherein the payment is at least one of cash, smart card, electronic payment, debit card, credit card, points, coupons, and a stored profile in an authentication server.

38. The method of claim 34, further comprising remotely authenticating the telematics control unit at a networked authentication server.

39. The method of claim 34, wherein the order selection menu includes a video and an audio announcement associated with at least one of the available items of the order selection menu.

40. The method of claim 34, wherein the order selection is made at the telematics control unit by at least one of a touch screen entry, a keyboard entry, and a spoken command.

41. The method of claim 34, further comprising receiving an electronic confirmation associated with the order selection.

42. The method of claim 34, further comprising receiving and storing a unique order identifier associated with the order selection at the telematics control unit.

43. The method of claim 42, further comprising communicating the unique order identifier from the telematics control unit to a fulfillment station terminal at a fulfillment station.

44. The method of claim 42, further comprising subsequently communicating the status of the order and procurement directions.

45. The method of claim 43, wherein the fulfillment station is a pick-up window.

46. The method of claim 43, wherein the fulfillment station is associated with delivery of at least one of food-items, dry-cleaning, and a pharmacy item.

47. The method of claim 34, further comprising fulfilling the order selection via delivery to a vehicle.

48. The method of claim 34, further comprising determining a default order selection based on a previous fulfilled order.

49. A system comprising: a customer authentication and payment server; a merchant data server, the merchant data server coupled to a public data network, the public data network coupled to the customer authentication and payment server;

a merchant network coupled to the merchant data server; and a merchant station coupled to the merchant network, the merchant station including a communication interface to provide for adhoc wireless communication between the merchant data server and wireless communication devices of customers located within a wireless coverage area, the merchant station adapted to provide an order selection menu to the wireless communication devices to facilitate a transaction, the order selection menu comprising a text description and an image associated with at least one item on the order selection menu;

wherein at least one of the customers is located within a vehicle having a telematics control unit;

wherein a merchant representative, via the merchant station and the wireless communication interface, may communicate with the customer via the telematics control unit; and wherein the merchant station includes a cordless headset for use by the merchant representative.

50. A system comprising: a customer authentication and payment server; a merchant data server, the merchant data server coupled to a public data network, the public data network coupled to the customer authentication and payment server;

a merchant network coupled to the merchant data server; and a merchant station coupled to the merchant network, the merchant station including a communication interface to provide for adhoc wireless communication between the merchant data server and wireless communication devices of customers located within a wireless coverage area, the merchant station adapted to provide an order selection menu to the wireless communication devices to facilitate a transaction, the order selection menu comprising a text description and an image associated with at least one item on the order selection menu;

wherein at least one of the customers is located within a vehicle having a telematics control unit;

wherein a merchant representative, via the merchant station and the wireless communication interface, may communicate with the customer via the telematics control unit; and wherein the telematics control unit is an on-board unit embedded within a dashboard area of the vehicle.

51. A system comprising: a customer authentication and payment server; a merchant data server, the merchant data server coupled to a public data network, the public data network coupled to the customer authentication and payment server;

a merchant network coupled to the merchant data server; and a merchant station coupled to the merchant network, the merchant station including a communication interface to provide for adhoc wireless communication between the merchant data server and wireless communication devices of customers located within a wireless coverage area, the merchant station adapted to provide an order selection menu to the wireless communication devices to facilitate a transaction, the order selection menu comprising a text description and an image associated with at least one item on the order selection menu;

wherein at least one of the customers is located within a vehicle having a telematics control unit;

wherein a merchant representative, via the merchant station and the wireless communication interface, may communicate with the customer via the telematics control unit; and wherein the telematics control unit is an offboard telematics control unit comprising a wireless device.

52. A method of processing wireless electronic drive-thru orders comprising: receiving notification at a merchant data server that a telematics control unit is detected within a wireless coverage area;

communicating an order selection menu from the merchant service terminal to the telematics control unit over a wireless channel, the order selection menu comprising a text description and an image associated with at least one item on the order selection menu;

receiving an order selection from the telematics control unit, the order selection communicated via data over the wireless channel;

authenticating the use of the telematics control unit at a networked authentication server remote from the merchant service terminal; and fulfilling the order selection received from the telematics control unit;

wherein the networked authentication server returns identifying information associated with vehicles owned by a user to facilitate matching the vehicle with the drive-thru order at pickup or for providing a customized order menu.

53. A method of placing a wireless electronic drive-thru order comprising:

receiving a service notification at a telematics control unit located within a wireless coverage area supported by a merchant electronic drive-thru service, the telematics control unit being mobile relative to the merchant electronic drive-thru service;

receiving and displaying on the telematics control unit an order selection menu communicated by the merchant electronic drive-thru service over an adhoc wireless channel, the order selection menu comprising an image and a text description related to at least one item on the order selection menu;

sending an order selection from the telematics control unit to the merchant electronic drive-thru service over the wireless channel using a secured connection;

receiving electronic confirmation at the telematics control unit, the electronic confirmation associated with acceptance of the order selection; and making a payment for the order selection;

wherein the order selection menu includes a video and an audio announcement associated with at least one available item of the order selection menu.

* * * * *